Feb. 6, 1968
D. S. CVACHO ET AL
3,367,825
APPARATUS FOR ADHESIVELY SPLICING CONSECUTIVE STRIPS TO EACH OTHER
Filed April 8, 1964
5 Sheets-Sheet 3
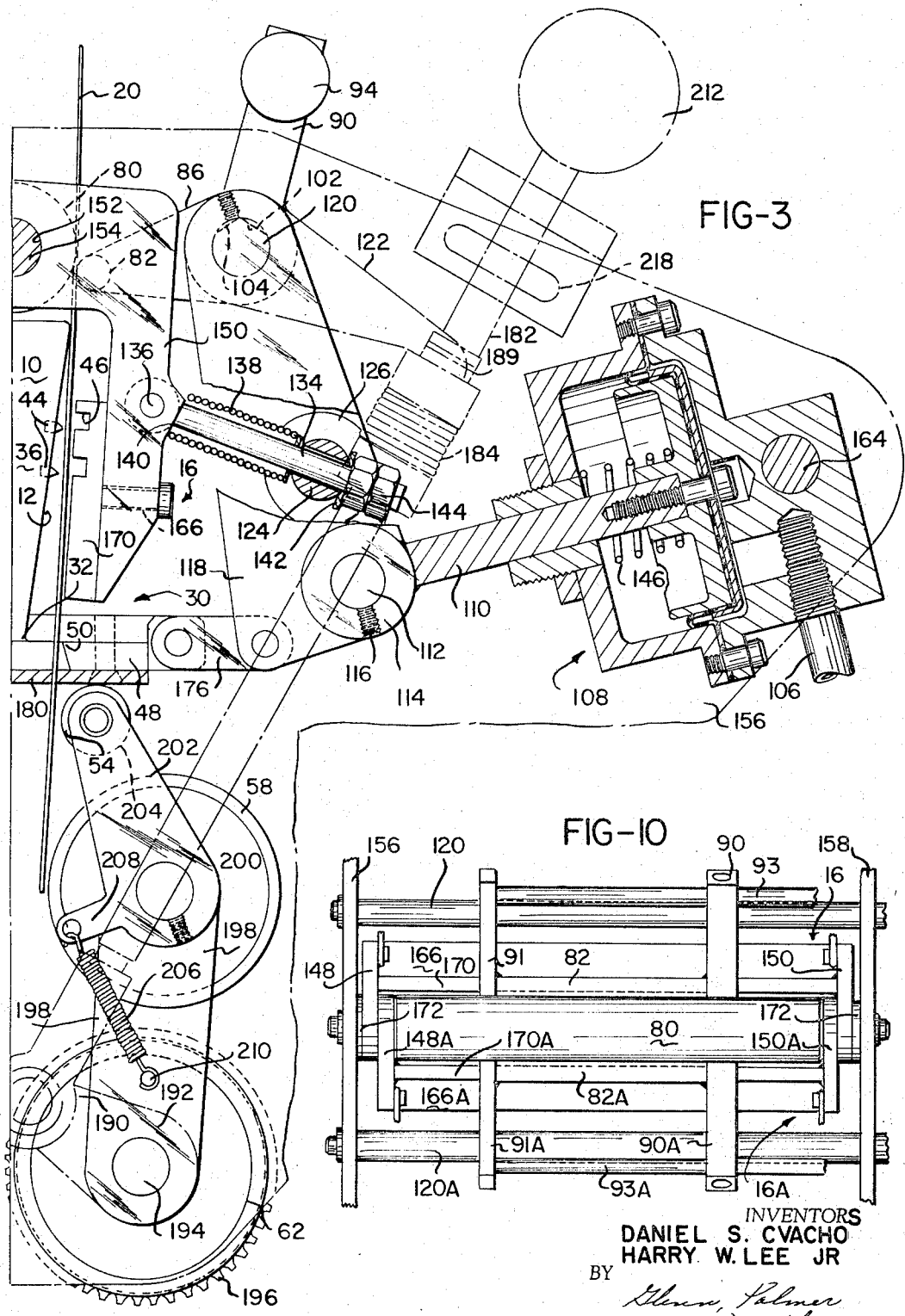
INVENTORS
DANIEL S. CVACHO
HARRY W. LEE JR
BY
THEIR ATTORNEYS

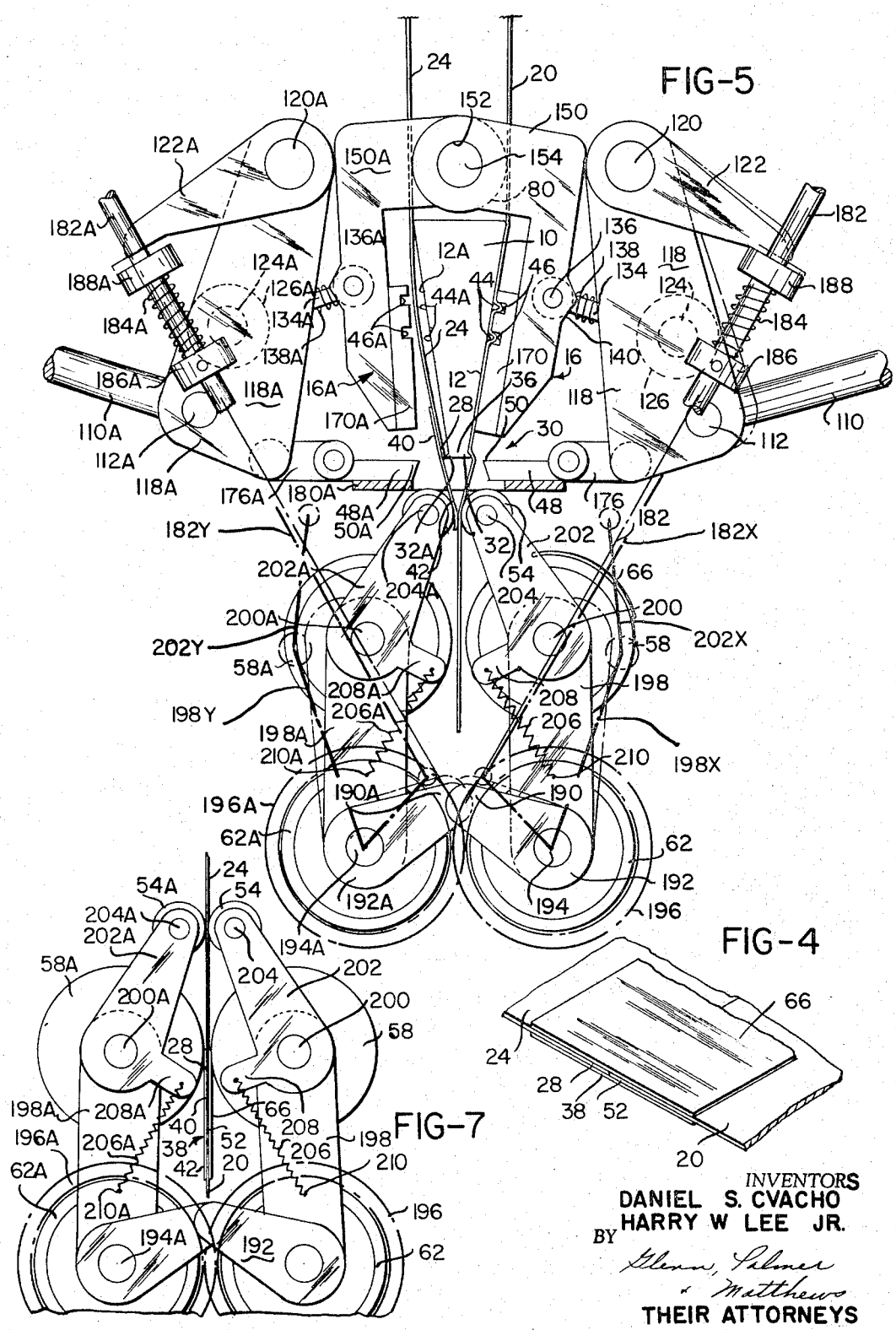

Feb. 6, 1968
D. S. CVACHO ET AL
3,367,825
APPARATUS FOR ADHESIVELY SPLICING
CONSECUTIVE STRIPS TO EACH OTHER
Filed April 8, 1964
5 Sheets-Sheet 5
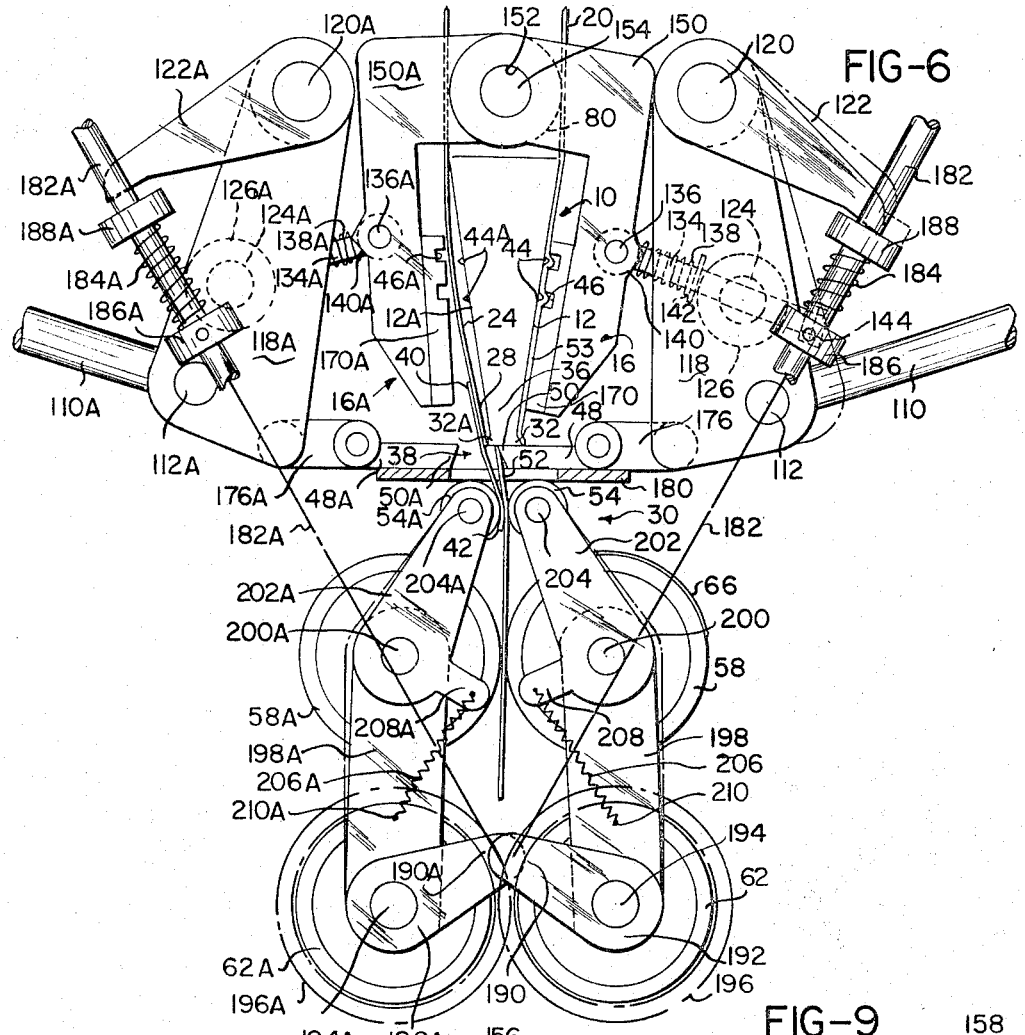
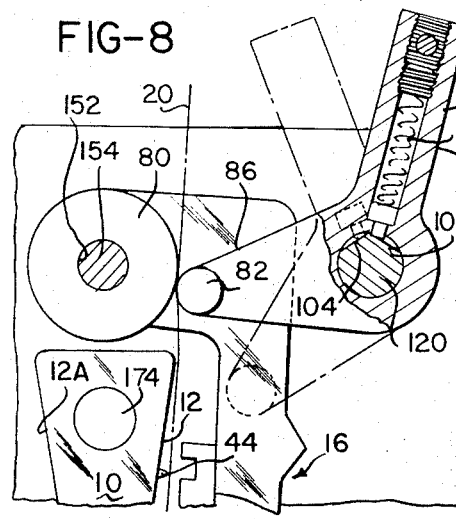
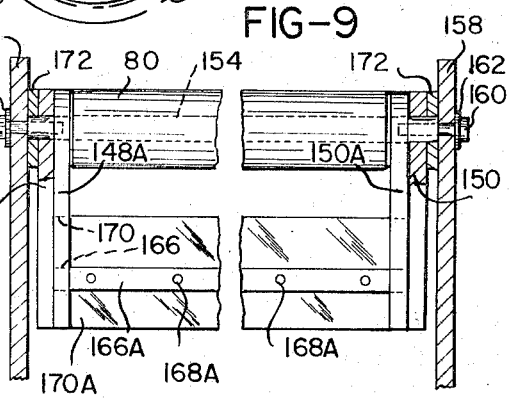
INVENTORS
DANIEL S. CVACHO
HARRY W. LEE. JR.
BY
*Glenn, Palmer
& Matthews*
THEIR ATTORNEYS

United States Patent Office 3,367,825
Patented Feb. 6, 1968

3,367,825
APPARATUS FOR ADHESIVELY SPLICING CONSECUTIVE STRIPS TO EACH OTHER
Daniel S. Cvacho and Harry W. Lee, Jr., Chesterfield County, Va., assignors to Reynolds Metals Company, Richmond, Va., a corporation of Delaware
Filed Apr. 8, 1964, Ser. No. 358,298
8 Claims. (Cl. 156—505)

ABSTRACT OF THE DISCLOSURE

This application discloses a method and apparatus for adhesively splicing consecutive strips or webs of material to each other. Such strips or webs may be used for any desired purpose, such as formation of tubes and the like. Consecutive strips of material may be spliced together with essentially no pause in the forward feeding movement of the strip material. A leading portion of a fresh, unexhausted strip is adhered to a trailing portion of a substantially exhausted strip and the unused trailing portion of the exhausted strip is cut behind the adhered portions of the strip. A unitary splicing mechanism is provided in which the splicing action and the cutting action are performed almost instantaneously with only an almost imperceptible pause in the forward movement of the strip construction which is compensated without pause in the feeding action at the place of use.

---

This invention is directed to a method and apparatus for adhesively splicing consecutive strips or webs of material to each other.

The invention is applicable for the feeding of such spliced strips or webs for any desired use, such as for the formation of tubes and the like from such spliced strips.

According to this invention, consecutive strips of material may be spliced together with substantially no pause in the forward feeding movement of the strip material.

A feature of this invention includes the adhesion of a leading portion of a fresh, unexhausted strip to a trailing portion of a substantially exhausted strip and the cutting of the unused trailing portion of the exhausted strip behind the adhered portions of the strips, so such adhered portions may be forwarded to the place of use.

Another feature of this invention includes a unitary splicing mechanism in which the splicing action and the cutting action are performed almost instantaneously with only an almost imperceptible pause in the forward movement of the strip construction which is compensated without pause in the feeding action at the place of use either by a dancer roll and the like or by a compensating short travel of the splicing mechanism during the splicing action.

Another feature of this invention includes the use of one or more relatively short adhesive strips to adhere together the consecutive strips of material being fed.

Other features are apparent from this description, the appended claimed subject matter, and/or the accompanying drawings, in which:

FIGURE 3 is an enlarged view of portions of FIGURE 2.

FIGURE 4 is a perspective of portions of the strips of material spliced together.

FIGURE 5 is a view similar to a portion of FIGURE 2 with the leading end of the left hand strip of material initially joined to an intermediate portion of the right hand strip of material.

FIGURE 6 shows the joining of the strips at a stage slightly later than in FIGURE 5.

FIGURE 7 shows the joining of the strips at a stage slightly later than in FIGURE 6.

FIGURE 8 shows a detail of the one way strip locking construction.

FIGURE 9 is a vertical cross-sectional view in reduced scale and with parts broken away of a portion of FIGURE 2 along the central vertical plane of FIGURE 2.

FIGURE 10 is a diagrammatic horizontal cross-section, on reduced scale, of certain elements, and taken along line 10—10 of FIGURE 2.

Figure 2:
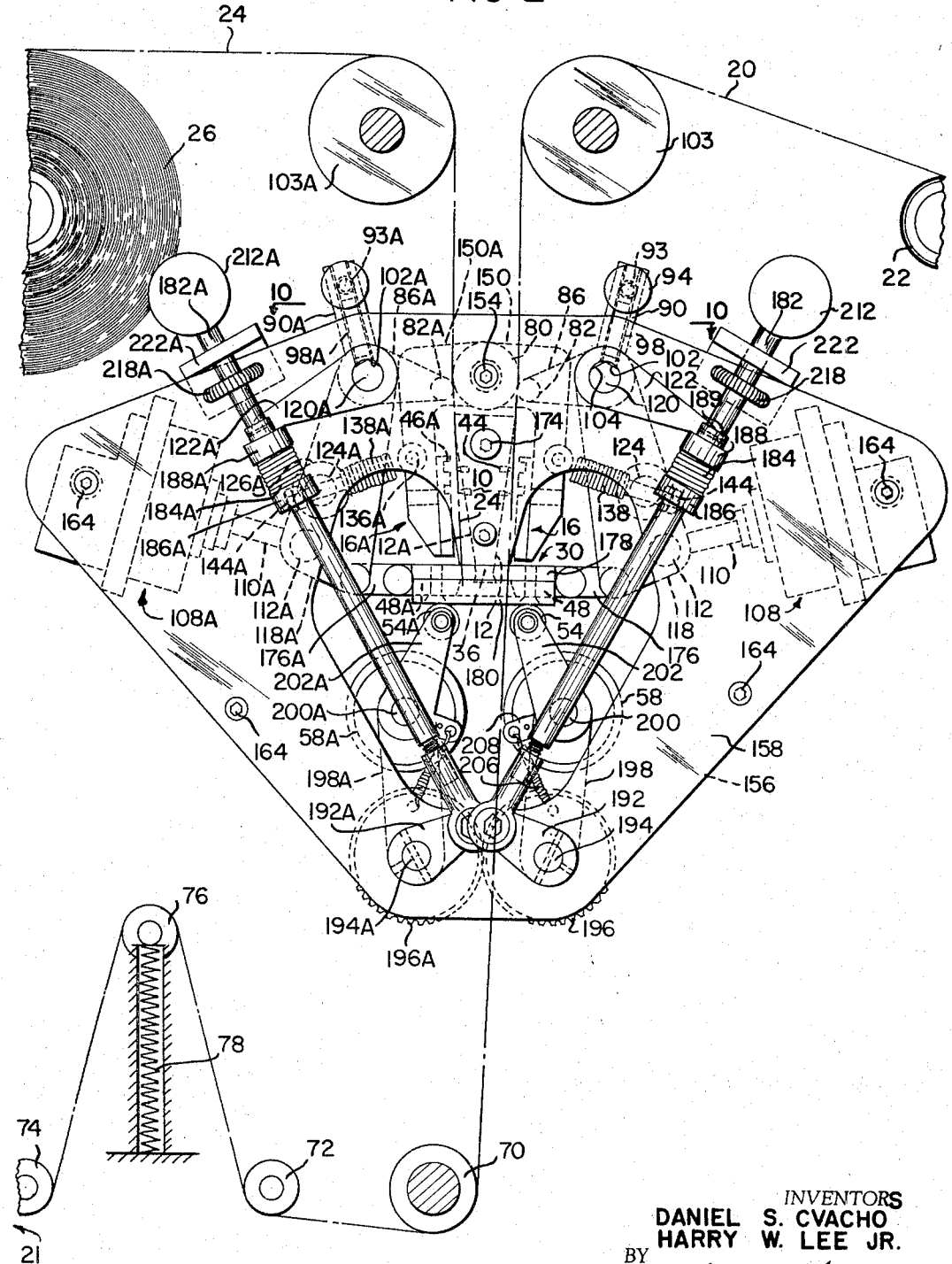
FIGURE 2 is a cross section along the line 2—2 of FIGURE 1 with only the right hand strip of material being fed through the machine.

In this apparatus there are many mirror image parts on opposite sides of the central vertical plane of FIGURES 2, 3, etc. Much of the description of such mirror parts will be applied to the right hand parts, as viewed in FIGURES 2, 3, etc., since many of these parts are the active ones in the specific operation to be described.

In order to avoid repetition in description and illustration many of these right hand parts will be identified with reference numerals having no suffix applied thereto. When desired, the left hand mirror image parts corresponding to such right hand parts will be identified with similar reference numerals to which the suffix A is applied. It is to be understood that descriptions of the right hand parts with their reference numerals are equally applicable to the mirror image left hand parts with similar reference numerals having the suffix A. The mirror image movement of such parts may be in the opposite direction, in many instances, as is readily understood.

Figure 1:
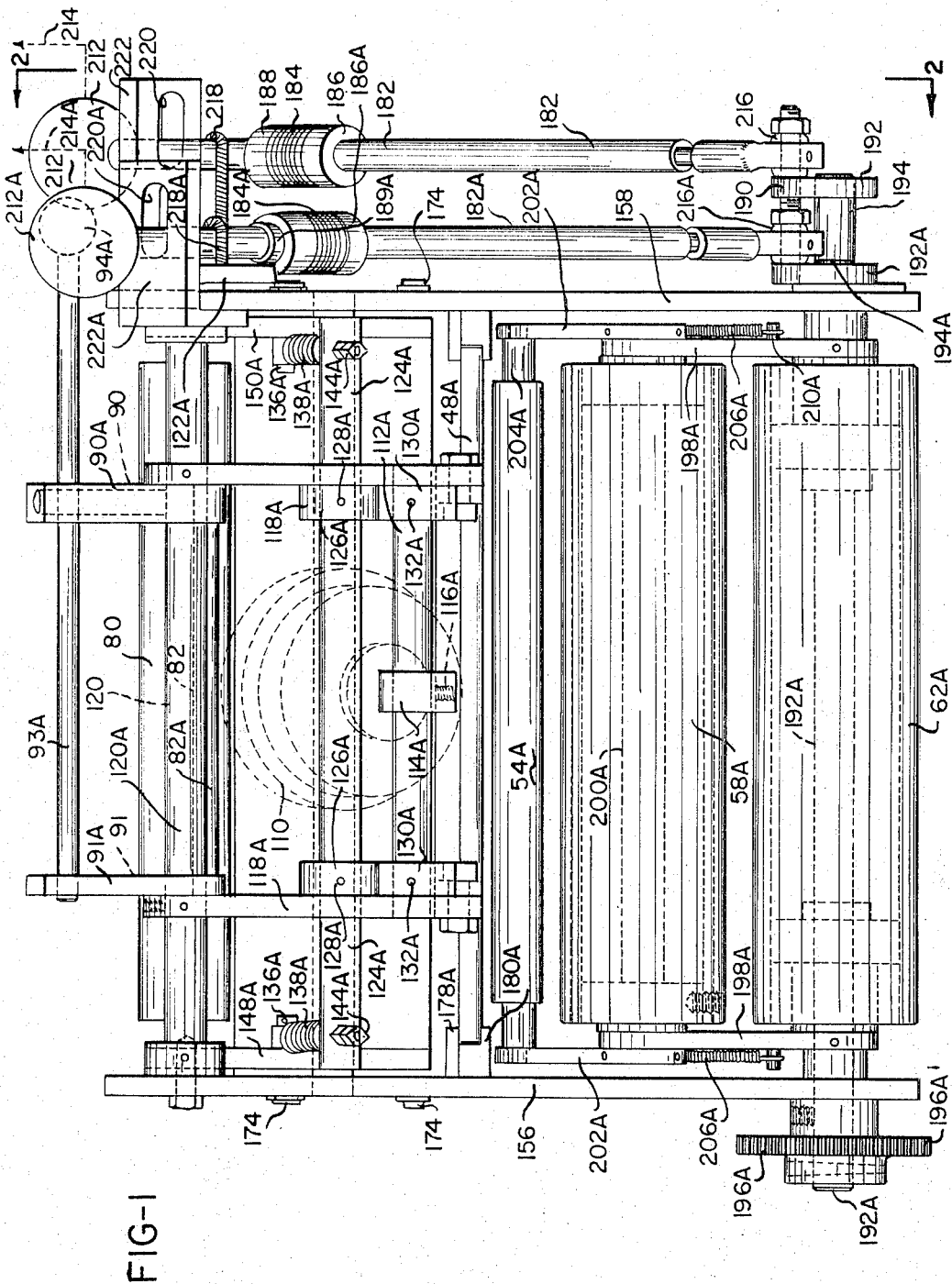
FIGURE 1 is a side elevation from the left side of FIGURE 2.

Since FIGURE 1 is an elevation taken from the left side of FIGURES 2, 3, etc., many of the parts shown in FIGURE 1 are mirror image parts with the suffix A applied thereto. However, it is to be understood that the corresponding right hand parts may have substantially the same side elevation as is shown for their mirror images in FIGURE 1.

According to this invention, a central brake member 10, FIGURE 5, is provided with opposite braking faces 12 and 12A. A pair of outer brake members 16 and 16A are provided adjacent the faces 12 and 12A. The outer brake members 16 and 16A are relatively movable toward and away from said faces 12 and 12A.

Introducing means are provided for introducing a first strip of material 20 between one of said faces 12 and one of said brake members 16. Such introducing means are elsewhere described. This strip 20 has been passing through the mechanism, as elsewhere described and is introduced or fed to a place of use, such as a tube making machine, or the like, not shown, as indicated by the arrow at 21, FIGURE 2.

Continued feeding of the strip 20 eventually substantially exhausts the source of supply or spool 22, and it is then desirable to splice or join a fresh or second strip of material 24 to the almost exhausted strip 20 so the fresh strip 24 and the joined portion of strip 20 may then be fed to the place of use.

To this end, introducing means are provided for introducing the second strip 24, from the fresh source of supply or spool 26, to the space between the face 12A of the brake 10 and the outer brake member 16A. Such introducing means is elsewhere described.

The leading end 28 of the strip 24 is introduced into the mechanism so it is adjacent a splicing zone 30. For example, it may be introduced to a place and substantially adjacent one of the two cutting edges 32 and 32A of a central cutting member or knife 36 which member 36 may be adjacent the central brake member 10.

A relatively short length of an adhesive strip 38 may have had its trailing end 40 previously secured to the leading end 28 of the strip 24 so the leading end 42 of the strip 38 extends forward of the end 28 of strip 24.

When the first strip 20 is substantially exhausted, a control button or the like, not shown, is energized or manipulated, and this causes relative movement between the brake members 10 and 16. For example, the outer brake member 16 may be moved toward the central brake member 10, which may be stationary. A plurality of pins 44 on member 10 and grooves or notches 46 on the member 16 temporarily arrest the forward feed of the first strip 20 and clamp such strip between the brake members 10 and 16.

Immediately after such clamping action, and substantially in unison therewith, an outer cutting member or knife 48 is moved relatively to the central cutting member 36, as by being moved leftwardly in FIGURE 5, so the cutting edges 50 and 32 sever the first strip 20 behind the portion of the strip 20 which is adhered or is being adhered to the end 28 of the second strip 24, as is shown in FIGURE 6. During this time the strip 24 is not clamped by the brake members 10 and 16A.

The joined or partially joined part 52 of the first strip 20 is therefore free to travel or be pulled forward to the place of use, while the unjoined part 53 of the strip 20 continues to be temporarily arrested between the brake members 10 and 16.

Thereafter the joined part 52 of the first strip 20 and the joined strip 24 are pulled forward by suitable feed mechanism for the tube making machine or the like. The part 52 and strip 24 pass between the pairs of rollers 54 and 54A, 58 and 58A, and 62, 62A. As they pass the rollers 54 and 54A, the adhesive strip 38 is completely adhered to the strips 20 and 24. The roller 58, and its companion roller 58A may both be rubber covered to produce a resilient pressing action on the strips 20 and 24.

The adhesive strip 38 is of the type in which the face adjacent the strips 20 and 24 is strongly adhesive, and the opposite face of the strip 38 not substantially adhesive, so the strip 38 is efficiently adhered to strips 20 and 24.

A relatively short length of a second adhesive strip 66 has been previously weakly and temporarily adhered to the roller 58. This strip 66 has a weakly adherent face adjacent the roller 58 and a strongly adherent opposite face. The strip 66 is placed on the roller 58 in such a position that subsequent rotation of roller 58 moves the strip 66 into contact with the ends 28 and 52, FIGURE 4, of the strips 24 and 20 on the opposite side from the adhesive strip 38. The rollers 58 and 58A are tightly held together while this joining operation takes place, as indicated in FIGURE 6, where the rollers 58 and 58A have been brought together to produce this action. The rubber coverings of rollers 58 and 58A aid in this operation.

Thereafter the strips 20 and 24 are pulled between the rollers 62, 62A, past the idler rolls 70, 72 and 74, FIGURE 2, and the dancer roll 76 which is upwardly urged by the dancer spring 78. The dancer roll 76 accumulates a surplus amount of strip material during normal operation, and pays it out during the splicing operation, so the tube making machine, or the like, can be continuously fed.

Manually movable introducing means may be provided to introduce the strips 20, 24, etc., into the splicing mechanism. Such introducing means may be one way or normally irreversible unless manually released, if desired.

Such introducing means may include a stationary bar or roll 80 and two adjacent bars or rolls 82 and 82A which normally are held against the bar 80 or against the strips fed between them. These bars 82 and 82A may be carried by lever constructions 86 and 86A which are movable by manually movable lever constructions 90 and 90A and knobs 94 and 94A.

The lever constructions 90 and 90A may have spring constructions 98 and 98A which engage the flat surfaces 102 and 104, FIGURES, to hold the bars 82 and 82A against the bar 80 or against the strip 20 or the like which has been introduced between them.

The lever constructions 90 and 90A may be manually moved to engage the surfaces 102 to hold the strip 20 (or 24) after it has been introduced, and to prevent any backward motion of such strip until the lever 90 (or 90A) has been manually moved to releasing position.

The bars 82 and 82A are also held by additional levers 91 and 91A which are loosely pivoted on bars 120 and 120A respectively. The levers 90A and 91A are secured and actuated together by a bar 93A which has a knob 94A for manual actuation. Similar levers 90, 91, bar 93 and knob 94 are provided to manipulate bar 82.

The strips 20 and 24 (and subsequent alternate strips) may also be passed over idler rolls 103 and 103A properly to align the strips with the brake members.

While "first" and "second" strips 20 and 22 have been specifically designated, in order specifically to describe the operation, other and alternate strips may be introduced into the mechanism, as is obvious.

For example, after the second or left hand strip 24 has been substantially exhausted from spool 26, the outer brake members 16A may be moved against the central brake member 10. A fresh "third" or right hand strip may alternately have been fed between the brake members 10 and 16 with an adhesive strip attached to the leading end of such third or left hand strip. A cutting member 48A may be moved toward the central cutting member 36 to sever the almost exhausted strip 24. The leading end of the new third strip may be adhered to an intermediate portion of the strip 24. Then the joined portion of strip 24 and the new third or right hand strip may be passed between the rolls 54, 54A, etc., to the place of use. Subsequently and alternately left and right hand strips may be introduced, spliced and fed to the place of use as often as desired.

Any suitable means to obtain operation of the foregoing members may be used.

For example, when it is desired to initiate a splicing operation with the strip 24 in position, a starting button or the like, not shown, is energized to supply compressed air to the inlet pipe 106 and to the compressed air piston 108, FIGURE 3, which causes the plunger 110 to move leftwardly. This moves the shaft 112 also leftwardly. The plunger 110 may be secured to a bearing ring 114 which is secured to shaft 112 by screw 116.

The shaft 112 is secured at its ends to rocker plates 118 which are secured to and rotatably rock the shaft 120, which shaft in turn rocks the lever 122 for a purpose to become apparent.

The rocker plates 118 have openings which receive a shaft 124 which rocks with the rocker plates 118.

The shaft 124 is axially fixed to the plates 118 by set collars 126 which permit the shaft 124 to have a slight rotary motion with respect to the plates 118. The collars 126 are fixed to shaft 124 by screws 128.

Likewise the shaft 112 is locked axially to the plates 118 by collars and screws corresponding to collars 130A and screws 132A.

The shaft 124 rocks the outer brake member 16 when the piston 108 is actuated by means of two pins 134 which pass through the shaft 124, FIGURE 3, and are attached to suitable rocking connecting constructions 136 on the brake member 16. A compression spring 138 surrounds the pin 134, and engages the flat surface 140 at one end and a washer 142 at the other end, which washer engages the shaft 124. Suitable lock nuts 144 on the pins 134 limit the outward expansion of the spring 138 and act to pull the brake member 16 outwardly when the piston 108 is deenergized or decompressed. The piston 108 may have a compression spring 146 which aids in this action.

The brake member 16 is pivoted near its ends by rocker arms 148 and 150 which have openings 152 to receive a shaft 154 which extends completely across the apparatus from the inside of one frame plate 156 to the inside of other frame plate 158. The shaft 154 may have substantially flat ends which may be threadedly bored to receive the screw bolts 160 firmly to secure and space the frame plates 156 and 158 with respect to each other. Washers 162 may be provided between the screws bolt heads and the frame plates.

Similar spacing and securing bar constructions 164 may be placed at other places between the frame plates firmly to secure the frame plates in spaced relationship, as indicated in FIGURES 2 and 3.

A spacing bar 166, FIGURE 3, spaces and is secured between the brake rocker arms 148 and 150 and is provided with openings to receive screw bolts 168 which pass through the bar 166 and hold the brake face member 170 in position to be pressed toward the central brake member 10 to arrest the strip of material passing therethrough.

The mirror outer brake member 16A may be provided with rocker arms 148A and 150A which are slightly closer together than rocker arms 148, 150 so all of these arms may be mounted on the shaft 154, as shown in FIGURE 9. Suitable washers 172 may be provided to space the rocker arms 148 and 150 from the frame plates 156 and 158.

The remaining parts of the mirror outer brake member 16A may be substantially the same as those described in connection with brake member 16, and hence are not further described, and are sometimes identified by reference numerals without a suffix A.

The central brake member 10 and central cutting member 36 may be made of several parts, if desired, but is herein disclosed as a unitary member which may extend from the inner surface of frame plate 156 to the inner surface of frame plate 158. Suitable threaded end openings, not shown, may be provided in such member to receive attaching screw bolt and washer constructions 174 to hold these members 10 and 36 in place.

The outer cutting member or knife 48 is horizontally oscillated when the rocker plates 118 are rocked by the air piston 108. To this end, suitable links 176 are connected to the knife 48 and to the plates 118, which are rocked by the piston 108.

The knife 48 slides between flanges 178 and 180 at its ends.

The knife 48A is similarly oscillated when the strip 24 is substantially exhausted and a new right hand strip is being attached thereto as such new strip is being fed between members 10 and 16.

The rollers 54, 54A and 58, 58A, FIGURE 2, are moved from their spread apart position in FIGURES 2 and 3 to closely adjacent positions as in FIGURES 5–7. This action takes place when either piston 108, at the right side, or piston 108A on the left side is actuated to move its corresponding plunger 110 or 110A inward.

For example, when the piston 108 is actuated and the shaft 120 is rocked clockwise, as elsewhere described, the lever 122 is also rocked clockwise and pushes down on the push rod 182 through the medium of the spring 184 which is attached to the rod 182 at collar 186 and has a sliding engagement at the collar 188 which receives and is pushed down by the end of lever 122. The collar 188 abuts against stop collar 189 which is pinned to the push rod 182 to limit the upward movement of collar 188 on rod 182.

The push rod 182, in turn, pushes down on the end 190 of lever 192 and rocks the lever counter clockwise along with the shaft 194 to which the lever is keyed.

The shaft 194 rotates the gear 196 at the other end of shaft 194 which in turn rotates in a clockwise direction the gear 196A and shaft 194A. The shaft 194A in turn rocks the lever 192A clockwise which pulls down push rod 182A. However, the downward motion of rod 182A has no effect on lever 122A. The lever 122A is held in its stationary position because the compression spring, not shown, corresponding to 146, in piston 108A holds the plunger 110A leftward and this in turn imparts a clockwise bias on lever 122A, to hold it in place.

However, the pairs of rollers 54, 54A and 58, 58A are brought together by the rocking movement of the shafts 194 and 194A. Shaft 194 is keyed to a pair of levers 198 and the shaft 194A is keyed to a pair of levers 198A which are rocked toward each other from the spread apart positions of FIGURES 2 and 3, toward the inward positions of FIGURES 5–7.

The upper ends of the pairs of levers 198 and 198A carry shafts 200 and 200A respectively on which pairs of levers 202 and 202A are rockably mounted. The pair of levers 202 carry a shaft 204 at their upper ends and the pair of levers 202A carry a shaft 204A at their upper end. The shafts 204 and 204A carry the rollers 54 and 54A respectively, and the shafts 202 and 202A carry the rollers 58 and 58A respectively.

The levers 202 and 202A are spring biased toward each other by springs 206 and 206A, FIGURE 5, which are attached respectively to the side levers 208 and 208A at their upper ends and to the levers 198 and 198A at their lower ends by pins 210 and 210A respectively. This causes the rollers 54 and 54A to initially engage the strips 38 and 20, as in FIGURE 5, and thereafter causes the rollers 58 and 58A to engage the strip 20, as in FIGURE 6.

In this manner the necessary various parts of the apparatus are actuated by the right hand plunger 110 when the right hand strip 20 (or any subsequent right hand strip) is the exhausted strip to be adhered to the left hand fresh strip 24 (or subsequent left hand strip).

On the other hand, the necessary various parts of the apparatus are actuated by the left hand plunger 110A when the left hand strip 24 (or any subsequent left hand strip) is the exhausted strip to be adhered to the right hand fresh strip 20 (or subsequent right hand strip).

This is accomplished because when the right hand plunger 110, FIGURE 6, is actuated when right hand strip 20 is substantially exhausted, the right hand outer brake 16, right hand knife 48 and the pairs of rollers 54, 54A and 58 and 58A are actuated, but the left hand outer brake 16A and the left hand knife 48A are not actuated, since the left hand push rod 182A moves away from left hand lever 122A without actuating the brake 16A and knife 48A. At this time the left hand plunger 110A would not be actuated to cause movement of brake member 16A and knife 48A.

However, when the left hand plunger 110A is actuated when the left hand strip 24 is the exhausted strip, then the lever 122A is downwardly actuated to operate brake 16A, knife 48A, and rollers 54, 54A and 58 and 58A. In this case an adhesive strip corresponding to 38 would be attached to the right hand strip corresponding to 20. The adhesive strip corresponding to strip 66 would be attached to roller 58A instead of roller 58. The right hand brake 16 and knife 48 would not be operated, because the plunger 110 would not be operating.

The rolls 62 and 62A are slightly spaced from each other as they idle freely on shafts 194 and 194A. They keep the strips sufficiently in alignment, in cooperation with the idler rolls 103 and 103A.

The pairs of rolls 54, 54A and 58, 58A may be spread apart for easy adjustment of the strips 20 and 24 and any subsequent strips that may be fed through the apparatus.

This may be accomplished by moving the knobs 212 and 212A rightwardly in FIGURE 1 and then axially outward, as indicated by the right angled arrows 214 and 214A. This is permitted by the gimbal type joints at 216 and 216A. The outward movement places the collars 188 and 188A sidewise of the levers 122 and 122A so they and the push rods 182 and 182A may be pulled axially outward. The sidewise movement must be accomplished against the leftward pull of the tension springs 218 and 218A which ordinarily hold the rods 182 and 182A at the left ends of the slots 220 and 222A in the brackets 222 and 222A.

The axial pull on the rods 182 and 182A swings the levers 192 and 192A away from each other to the axial positions 182X and 182Y, FIGURE 5, so the levers 198 and 198A and levers 202 and 202A swing away from each other to axial positions 198X, 198Y and 202X and 202Y in FIGURE 5. The rollers 54, 54A, 58 and 58A likewise will swing outwardly and will permit the strips to be more readily manipulated.

The splicing machine may be mounted on tracks, not shown, and may be made movable thereon while the splicing operation is being performed in lieu of the dancer roll construction. This sidewise movement may be imparted thereto by suitable drawing means. Alternatively, the sidewise pull of the strip material against a weak spring tension or the like may be used to provide the sidewise movement of the machine.

The adhesive strips 38 and 66 used to join the strips 20, 24, etc., may be coated with adhesive requiring a strong pressing action to make them adhere. The rollers 54, 54A and 58, 58A may then be brought together with sufficient force to cause the desired adhesion. On the other hand, these strips do not accidentally adhere to other parts because they are not firmly pressed against such other parts.

It is thus to be seen that a new and useful method and apparatus have been provided efficiently to join consecutive strips of material as they are being serially fed to tube making machinery and the like.

While the form of the invention now preferred has been disclosed as required by statute, other forms may be used, all coming within the scope of the claimed subject matter which follows.

What is claimed is:

1. In combination: a central brake member having opposite faces; a pair of outer brake members adjacent said opposite faces and being relatively movable toward and away from said faces; means for introducing a first strip of material between one of said faces and one of said outer brake members and to a place of use; means for introducing a second strip of material between the other of said faces and the other of said outer brake members; means for clamping said first of said strips between a respective pair of said brake members; means for adhering the end of said second strip to an intermediate portion of said first strip in a splicing zone beyond said brake members when said one strip is clamped between said brake members; cutting means for cutting said first strip behind the adhered portion of said first strip to form a joined portion of said first strip and said second strip; and means to feed said joined portions to a place of use.

2. A combination according to claim 1 in which subsequent strips may be similarly, alternately introduced, adhered, cut and fed to said place of use.

3. A combination according to claim 1 in which said cutting means includes a central cutting member adjacent said central brake member and a pair of outer cutting members adjacent said outer brake members and being relatively movable toward and away from said central cutting member in substantial unison with said brake members.

4. A combination according to claim 1 in which said introducing means includes manually movable one way holding means for said strips.

5. A combination according to claim 1 in which means are provided for adhering to an intermediate portion of said first strip a relatively short length of an adherent tape which has been adhered to an end of said second strip.

6. A combination according to claim 5 in which means are provided for adhering a second relatively short length of an adherent tape to said strips on the opposite sides of said strips from said first named tape.

7. A combination according to claim 1 in which said means to feed said joined portions includes a pair of rollers between which said joined portions are pressed.

8. A combination according to claim 7 in which means are provided for spreading said rollers apart.

References Cited
UNITED STATES PATENTS

| | | | |
|---|---|---|---|
| 2,706,516 | 4/1955 | Evers | 256—504 |
| 2,745,464 | 5/1956 | Auerbacher et al. | 156—504 |
| 2,766,811 | 10/1956 | Armelin et al. | 156—504 |
| 2,987,108 | 6/1961 | Kilmartin | 156—504 |
| 3,065,782 | 11/1962 | Vergobbi | 156—504 |
| 3,089,661 | 5/1963 | Phillips et al. | 156—504 |

DOUGLAS J. DRUMMOND, *Primary Examiner.*